(12) United States Patent
Tai (10) Patent No.: US 10,479,601 B2
(45) Date of Patent: Nov. 19, 2019

(54) SORTING SYSTEM AND SORTING METHOD (71) Applicant: MURATA MACHINERY, LTD., Kyoto-shi, Kyoto (JP)

(72) Inventor: Akito Tai, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 190 days.

(21) Appl. No.: 15/502,262

(22) PCT Filed: Jun. 15, 2015

(86) PCT No.: PCT/JP2015/067148
§ 371 (c)(1),
(2) Date: Feb. 7, 2017

(87) PCT Pub. No.: WO2016/031352
PCT Pub. Date: Mar. 3, 2016

(65) Prior Publication Data
US 2017/0217681 A1 Aug. 3, 2017

(30) Foreign Application Priority Data
Aug. 26, 2014 (JP) .................. 2014-171758

(51) Int. Cl.
*B65G 1/04* (2006.01)
*B65G 1/00* (2006.01)
(52) U.S. Cl.
CPC ......... *B65G 1/0457* (2013.01); *B65G 1/0485* (2013.01)

(58) Field of Classification Search
CPC ........ B65G 1/0457; B65G 1/0485; B07C 5/36
See application file for complete search history.

(56) References Cited

U.S. PATENT DOCUMENTS

| 3,033,392 A | * | 5/1962 | Baumann | B65G 1/04 414/281 |
| 3,531,705 A | * | 9/1970 | Rosin | B65G 1/0421 318/162 |
| 3,776,399 A | * | 12/1973 | Atwater | B65G 1/0485 414/281 |
| 3,792,785 A | * | 2/1974 | Weir | B65G 1/0407 414/278 |
| 3,863,777 A | * | 2/1975 | Murata | B65G 1/0485 414/282 |

(Continued)

FOREIGN PATENT DOCUMENTS

| JP | 63-242809 A | 10/1988 |
| JP | 2009-280294 A | 12/2009 |

*Primary Examiner* — Saul Rodriguez
*Assistant Examiner* — Ashley K Romano
(74) *Attorney, Agent, or Firm* — Keating & Bennett, LLP (57) ABSTRACT

A compact and high capacity sorting system includes a transportation vehicle travelling along a travelling route where the transportation vehicle may diverge and merge, and raising and lowering a transfer device; racks provided along the travelling route and having a height corresponding to multiple floors; an arrival area, a shipment area, and a sorting area, each provided along an outer periphery of the travelling route; and a controller controlling the transportation vehicle to transport commodities from the arrival area to the sorting area via the racks, and transport commodities from the sorting area to the shipment area.

3 Claims, 7 Drawing Sheets

(56) References Cited

U.S. PATENT DOCUMENTS

| | | | | |
|---|---|---|---|---|
| 3,995,752 A * | 12/1976 | Tamura | ............... | B23Q 7/10 |
| | | | | 414/282 |
| 2003/0059284 A1* | 3/2003 | Inui | ............... | B65G 1/0485 |
| | | | | 414/331.02 |
| 2003/0235486 A1* | 12/2003 | Doherty | ............ | H01L 21/67733 |
| | | | | 414/217.1 |
| 2005/0056573 A1* | 3/2005 | Berdelle-Hilge | ......... | B07C 1/00 |
| | | | | 209/584 |
| 2005/0139564 A1* | 6/2005 | Nakao | ............... | B65G 1/0457 |
| | | | | 212/71 |
| 2006/0072987 A1* | 4/2006 | Hoshino | ............... | B65G 1/0457 |
| | | | | 414/277 |
| 2006/0222479 A1* | 10/2006 | Shiwaku | ............... | B65G 1/0457 |
| | | | | 414/267 |
| 2007/0276535 A1* | 11/2007 | Haag | ............... | B65G 1/0485 |
| | | | | 700/217 |
| 2008/0168920 A1* | 7/2008 | Nakashima | .......... | B65G 1/0457 |
| | | | | 104/124 |
| 2009/0324378 A1* | 12/2009 | Schafer | ............... | B65G 1/1378 |
| | | | | 414/795.9 |
| 2012/0114453 A1* | 5/2012 | Ota | ............... | B65G 1/0457 |
| | | | | 414/281 |
| 2013/0020272 A1* | 1/2013 | Kropveld | ............... | B65G 1/026 |
| | | | | 211/153 |
| 2013/0202392 A1* | 8/2013 | Morimoto | ......... | H01L 21/67733 |
| | | | | 414/267 |
| 2014/0003902 A1* | 1/2014 | Inui | ............... | B65G 49/00 |
| | | | | 414/749.1 |
| 2014/0088748 A1 | 3/2014 | Woodtli et al. | | |
| 2015/0110585 A1* | 4/2015 | Ota | ............... | H01L 21/67733 |
| | | | | 414/222.13 |
| 2016/0272423 A1* | 9/2016 | Yoo | ............... | H01L 21/67733 |
| 2016/0280460 A1* | 9/2016 | Porat | ............... | B65G 1/137 |
| 2016/0289001 A1* | 10/2016 | Shibata | ............ | H01L 21/67769 |
| 2017/0183156 A1* | 6/2017 | Yoshioka | ............ | H01L 21/6773 |
| 2017/0190510 A1* | 7/2017 | Porat | ............... | B65G 1/06 |
| 2017/0217681 A1* | 8/2017 | Tai | ............... | B65G 1/0457 |

* cited by examiner

SORTING SYSTEM AND SORTING METHOD

BACKGROUND OF THE INVENTION

1. Field of the Invention

The present invention relates to a sorting system and a sorting method.

2. Description of the Related Art

Conventional sorting systems have an automated storage and retrieval warehouse including a rack and a stacker crane. The warehouse is connected to peripheral stations via rail-guided vehicles. The conventional sorting systems perform sorting in combination with a long range conveyor, a vertical conveyor, and so on. Therefore, the conventional sorting systems need a wide variety of transportation equipment and transportation vehicles. Also, the system architecture of the conventional sorting systems is complicated.

JP S63-242809A proposes to transport articles by overhead travelling vehicles in a factory among an arrival area, the racks of a storage, and an assembly line. Further, according to JP S63-242809A, the travelling route of the overhead travelling vehicles is provided with diverging sections and merging sections, and therefore, the overhead travelling vehicles may have access to the racks. However, JP S63-242809A does not deal with the sorting of articles.

SUMMARY OF THE INVENTION

Preferred embodiments of the present invention provide a sorting system and a sorting method preferably using one kind of transportation vehicle, and being compact in size and highly efficient.

A sorting system according to a preferred embodiment of the present invention, for sorting and shipping commodities, includes a transportation vehicle including a transfer device and traveling along a travelling route to diverge and merge and to raise and lower the transfer device; racks provided along the travelling route and having a height corresponding to multiple floors; an arrival area, a shipment area, and a sorting area along an outer periphery of the travelling route; and a controller configured or programmed to control the transportation vehicle so that the transportation vehicle transports the commodities from the arrival area to the sorting area via the racks and transports the commodities from the sorting area to the shipment area.

A sorting method for sorting and shipping commodities using a sorting system including a transportation vehicle including a transfer device and traveling along a travelling route to diverge and merge and to raise and lower the transfer device, racks provided along the travelling route and having a height corresponding to multiple floors, an arrival area, a shipment area, and a sorting area along an outer periphery of the travelling route, and a controller, the method including transporting the commodities from the arrival area to the sorting area via the racks and transporting the commodities after sorting from the sorting area to the shipment area by the transportation vehicle under control of the controller.

According to various preferred embodiments of the present invention, the transportation vehicle travels along the travelling route that enables the transportation vehicle to diverge and merge so that the transportation vehicle is able to access a wide range of racks. Thus, the controller may cause the transportation vehicle to perform transportation from the arrival area to the rack, transportation from the rack to the sorting area, and transportation from the sorting area to the shipment area and the rack. Therefore, a plurality of different types of transportation devices, such as a stacker crane, rail guided vehicles, and a long range conveyor are not needed. Further, the arrival area, the shipment area, and the sorting area are arranged along the travelling route, and as a result, the sorting system is compact in size.

According to various preferred embodiments of the present invention, compact and highly efficient sorting systems and methods capable of using only one kind of transportation device are provided.

In preferred embodiments of the present invention, sorters that separate commodities according to their shipping destinations without storing the commodities for a long period as the stock, and pickers that store the commodities as the stock are different from each other.

Preferably, the arrival area and the shipment area are provided on a ground floor so that the entrance and the exit of trucks are made easy, and the sorting area is provided on at least an upper floor, in particular, preferably on multiple upper floors so that the system building requires a small site area.

Preferably, the travelling route includes rails provided in a ceiling space of a building accommodating the sorting system, and the transportation vehicle includes a carriage that travels along the rails; at least a mast suspended from the carriage; and an elevation platform including the transfer device and that is able to be raised and lowered along the mast. While a mast vertically standing from a carriage running on the ground may fall, the mast suspended from the carriage in the ceiling space has no risk of falling and is able to be made lighter in weight. Also, a ground carriage supporting the mast can be made lighter in weight or omitted. Further, when the carriage is made lighter, then the ceiling rails can be made lighter.

Preferably, the transportation vehicle preferably includes a pallet transportation vehicle and a case transportation vehicle, and both the pallet transportation vehicle and the case transportation vehicle are able to travel along the rails. The case transportation vehicle performs sorting in case units, and the pallet transportation vehicle transports pallets before sorting and pallets after sorting. Further, the pallet transportation vehicle and the case transportation vehicle travel along the common travelling route, and, in particular, it is more efficient when both the pallet transportation vehicle and the case transportation vehicle are able to travel along the entire travelling route.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

The following describes preferred embodiments of the present invention. The scope of the present invention shall be construed based upon the claims and according to the understanding of a person skilled in the art with reference to the specification.

Figure 1:
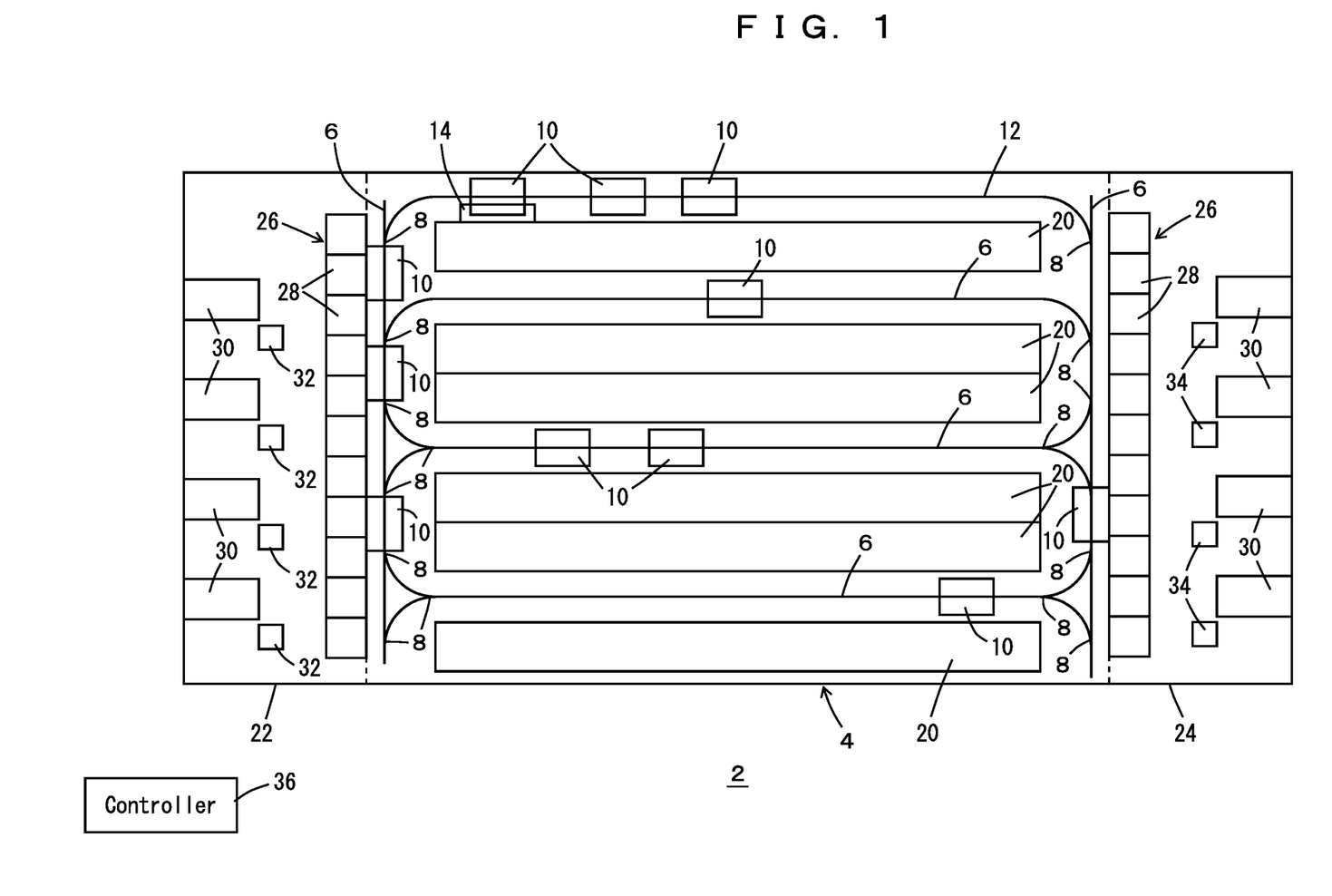
FIG. 1 is a plan view showing a layout of a sorting system according to a preferred embodiment of the present invention.
Figure 2:
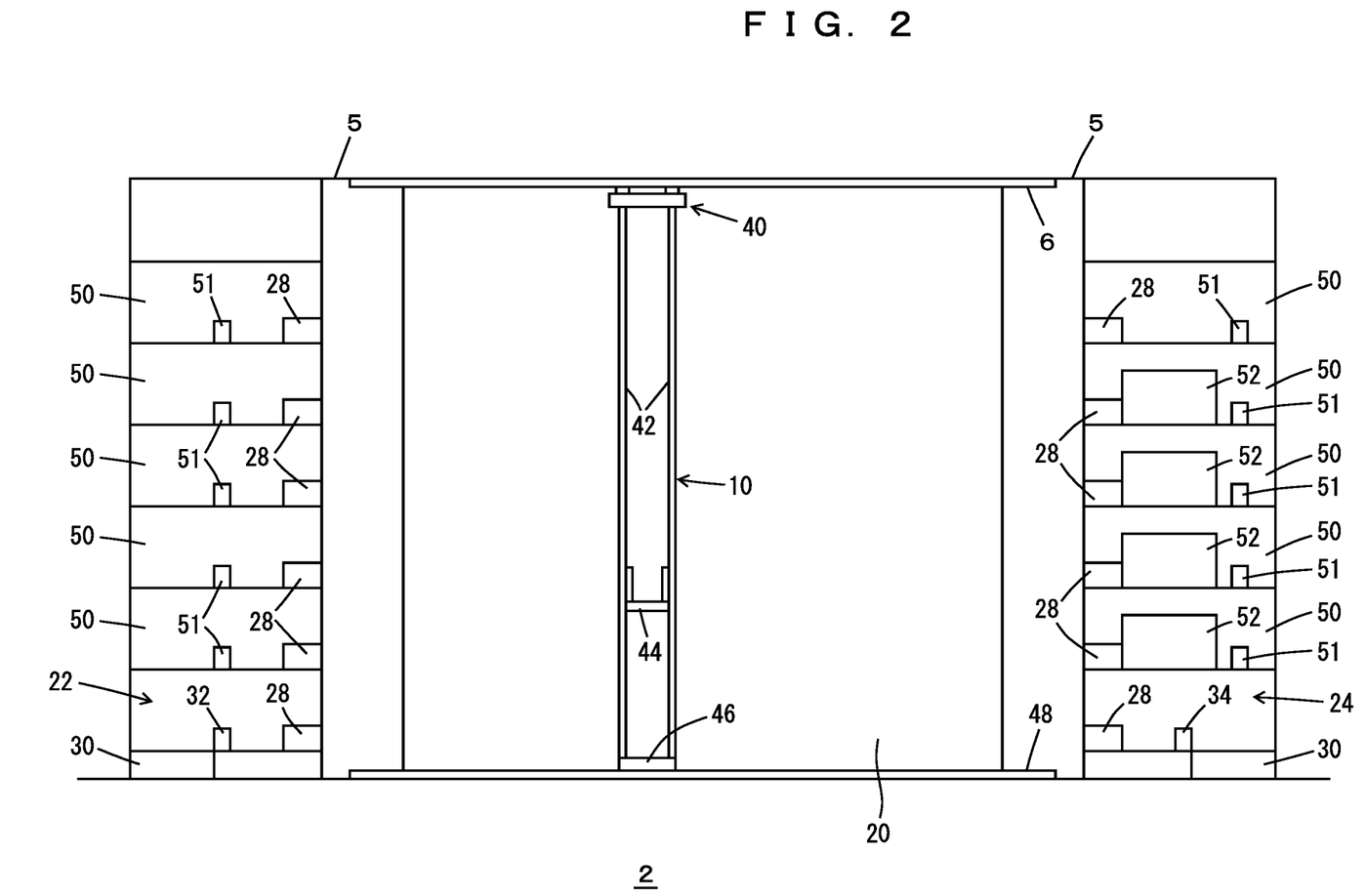
FIG. 2 is a side view of a sorting system according to a preferred embodiment of the present invention.

FIGS. 1-8 show sorting systems according to preferred embodiments of the present invention. FIGS. 1 and 2 show a layout of a sorting system 2. An automated storage and retrieval warehouse 4 includes ceiling rails 6 in a ceiling space, and a travelling route including the ceiling rails 6 with plural diverging and merging sections 8 so that plural overhead travelling vehicles 10 travel along the ceiling rails 6 and diverge and merge autonomously. While the ceiling rails (in the following, "rails") 6 may allow bi-directional travelling, the overhead travelling vehicles preferably travel uni-directionally according to the present preferred embodiment, for example. Plural racks 20 are provided along the rails 6, and the overhead travelling vehicles 10 may access any cell of any of the racks 20.

An arrival area 22 is provided on a ground floor of the sorting system 2 and is adjacent to one end of the automated storage and retrieval warehouse 4. A shipment area 24 is provided on the same ground floor and is adjacent to the other end of the automated storage and retrieval warehouse 4. The arrival area 22 and the shipment area 24 are provided along the outer periphery of the travelling route including the rails 6, may be adjacent to the side surface of the automated storage and retrieval warehouse 4, and are respectively provided with station arrays 26 each including a row of stations 28. Further, the overhead travelling vehicles are structured and operative to transfer a pallet, a case, and the like at each station 28, for example. Further, the areas 22, 24 are provided with berths 30, respectively, and operators may input arrival data via arrival terminals 32 in the arrival area 22 and may require transporting of the arrived commodities into the rack 20 via the terminal. The operators may input shipment data via shipment terminals 34. The sorting system 2 includes a controller 36 configured or programmed to control the system, and the controller include a single computer or plural distributed computers, for example.

Since all of the overhead travelling vehicles are not required to operate at all times, it is preferable to provide at least a retreating lane 12 to accommodate retreating overhead travelling vehicles 10 that are not operating so as to save power consumption. The retreating lane 12 preferably includes a maintenance deck 14 to make the maintenance of elevation platforms and carriages of the overhead travelling vehicles easier. The retreating lane 12 is, for example, provided at a position not facing the rack 20.

With respect to the overhead travelling vehicle 10, a carriage 40 travels along the ceiling rail 6, and a front mast 42 and a rear mast 42 are suspended from the carriage 40 by unshown pins, and so on, so that the masts may rock along the travelling direction. Along the masts 42, 42, an elevation platform 44 raises and lowers, and the front and rear masts 42, 42 are connected by a connection portion 46 at their lower ends. The overhead travelling vehicle 10 may be a stacker crane in which a travel drive mechanism and an elevation drive mechanism are provided in the carriage 40 at the ceiling space and the mast 42 is capable of rocking.

In the upper floors over the areas 22 and 24, sorting areas 50 are provided over multiple floors along the outer periphery of the travelling route including the ceiling rails 6, and the overhead travelling vehicles 10 transport pallets and cases, and so on, to and from the sorting area 50 via the stations 28. In the sorting areas 50, articles on pallets are sorted in case units where the cases may include cardboard boxes, and so on, and are loaded on pallets, and so on, for respective destinations, or individual commodities are taken out of pallets and are sorted into cases such as buckets. Sorting terminals 51 receive and display instructions regarding sorting from the controller 36 and respond the sorting results to the controller 36. The sorting areas may be equipped with arbitrary sorting devices, and, for example, sorters 52 take out cardboard boxes from pallets one by one and load them on case pallets 86 shown in FIG. 7.

Figure 3:
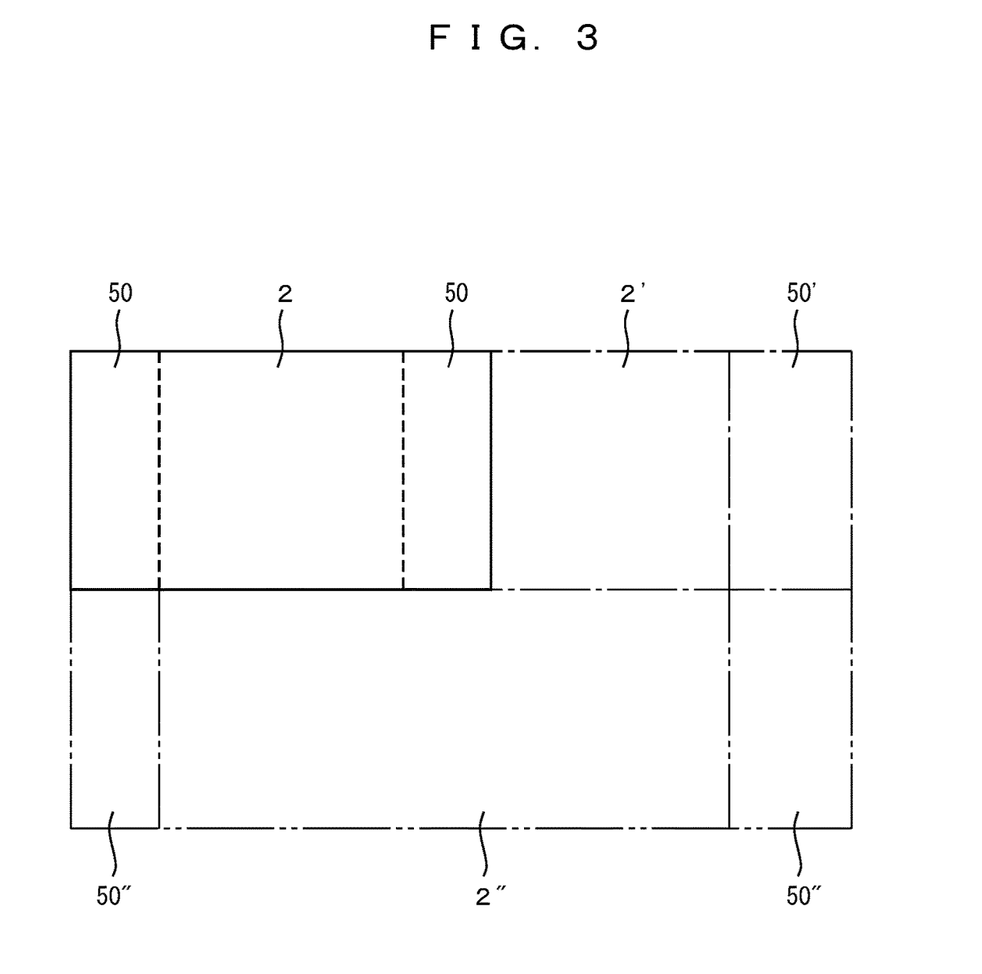
FIG. 3 is a schematic diagram showing expansions of a sorting system according to a preferred embodiment of the present invention.

The sorting system 2 may be expanded successively, and this situation is shown in FIG. 3. In FIG. 3, symbol ' indicates elements after expansion, and the numeral 2, and so on, in 2, 2', and so on, indicates elements of the same species. For example, a first sorting system 2 in the upper row in FIG. 3 may be expanded into a sorting system 2' and may further be expanded into a sorting system 2".

Figure 4:
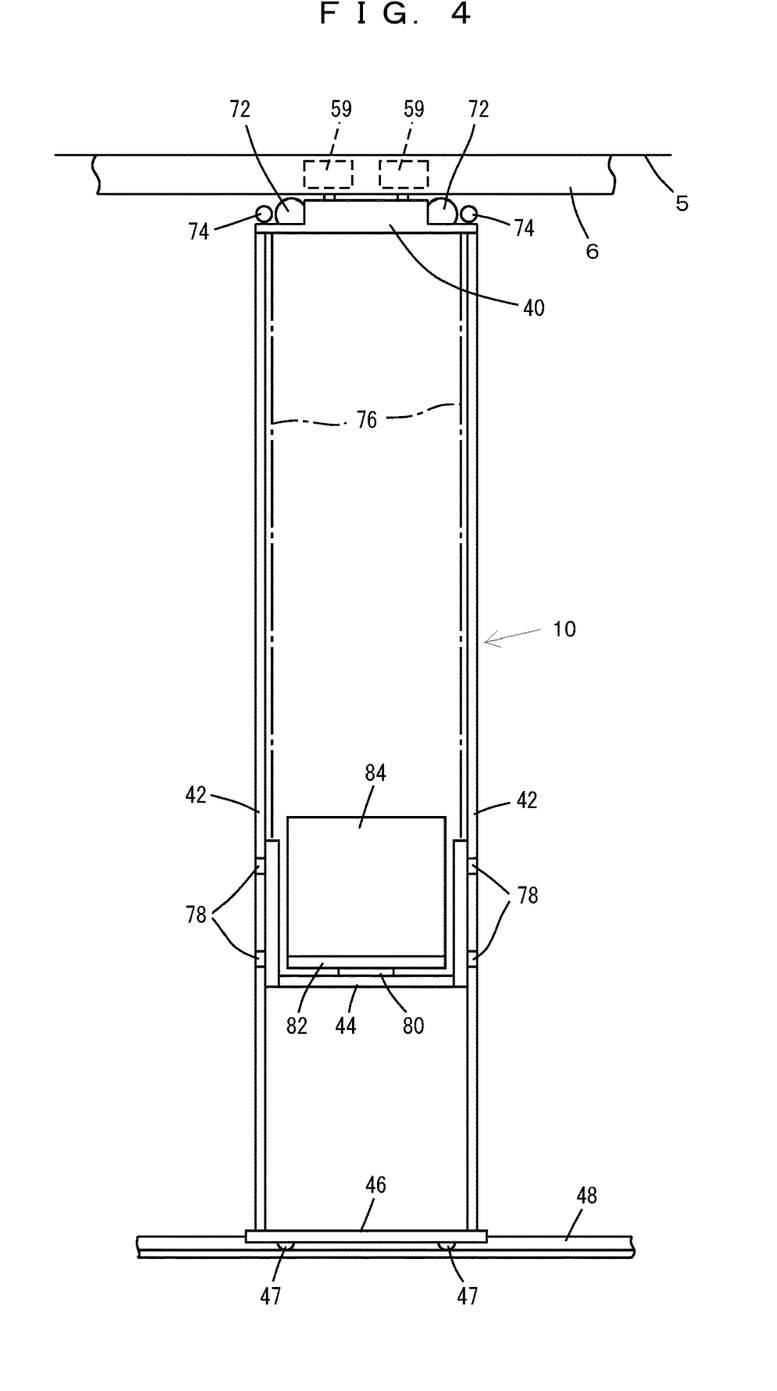
FIG. 4 is a side view of an overhead travelling vehicle according to a preferred embodiment of the present invention.
Figure 5:
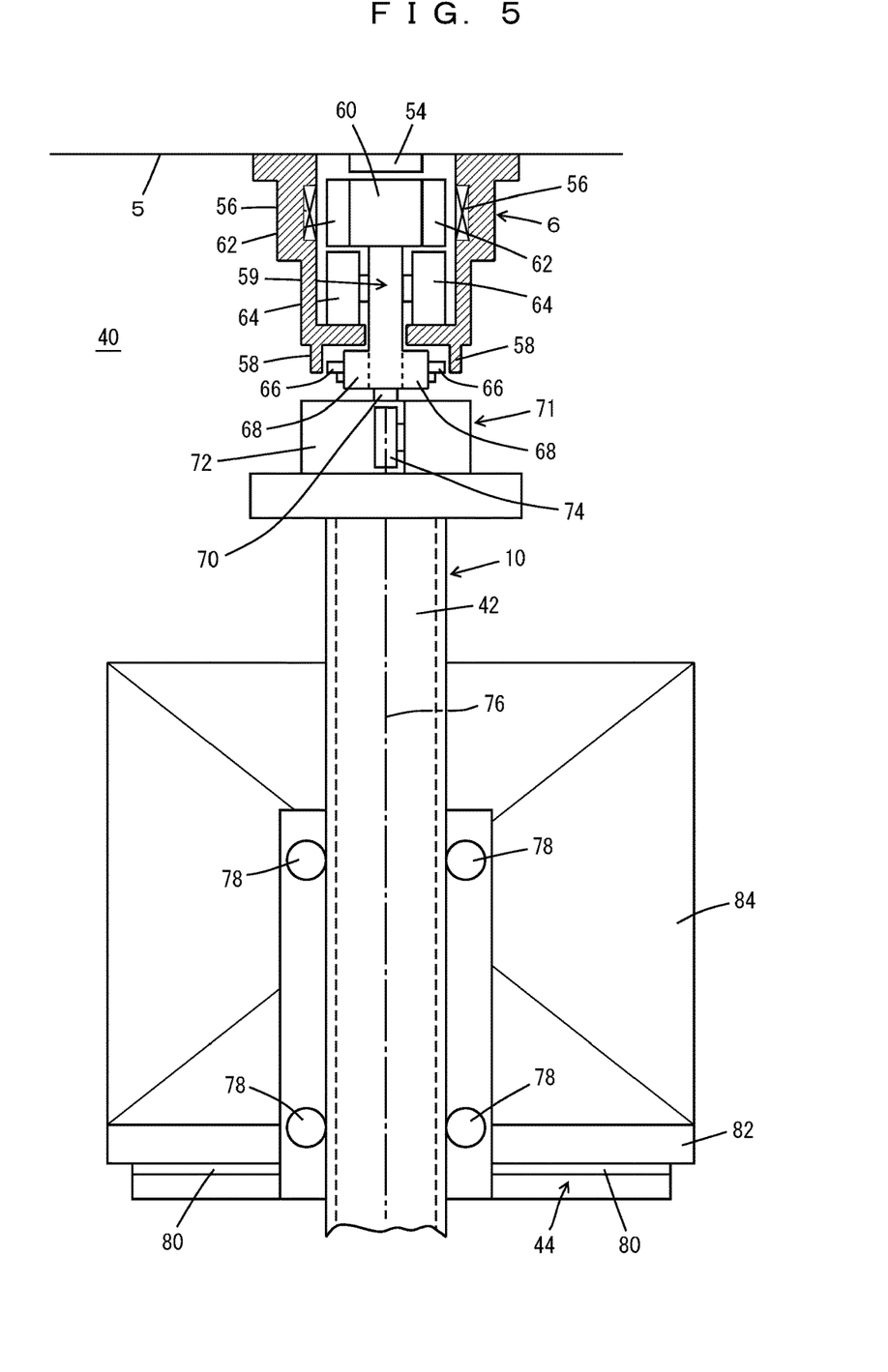
FIG. 5 is a fragmentary enlarged front view of an overhead travelling vehicle according to a preferred embodiment of the present invention.

FIGS. 4 and 5 illustrate the structure of the overhead travelling vehicle (in the following, "vehicle") 10. The rails 6 are fixed under the ceiling 5 of a building including mutually connected self-standing racks 20, and the rails 6 include a row of permanent magnets 54 and contactless electrical feeding lines 56. On the bottom portion of the rails 6 are provided left and right guide rails 58, 58 for the selection between diverging and traveling straight ahead and also to control the posture during merging. The carriage 40 of the vehicle 10 is provided with travelling units 59. A combination of a coil 60 of the travelling units 59 and the permanent magnets 54 of the rails 6 constitutes a linear motor. Power receiving coils 62 receive electricity from the contactless electrical feeding lines 62, and wheels 64 support the weight of the vehicle 10. Further, the travelling units 59 are equipped with left and right guide rollers 66, 66, and a travelling controller 68 causes the guide rollers 66, 66 to be advanced and retracted between a position guided by the guide rail 58 and a position not guided. Thus, the vehicle 10 diverges and merges autonomously, however, as is taught in JPS63-242809A, diverging and merging are controlled by a movable mechanism provided in the rails 6.

A chassis 71 of the carriage 40 is attached to a vertical shaft 70 of the travelling unit 59, and the front and rear masts 42 are attached to the chassis 71 by unshown pins, or the like, so that they may rock along the travelling direction. A chain 76 is driven by a motor 72 and sprocket 74 of the chassis 71 so as to raise and lower the elevation platform 44 and an unshown counter weight. Guide rollers 78 of the elevation platform 44 are guided by the masts 42 so as to restrict the vibrations and twists of the elevation platform 44, and a transfer device 80, such as a slide fork, transfers pallets 82 and so on. Articles 84 are located on a pallet 82. Further, another driver such as a belt may be used in place of the chain, and the counter weight may be omitted.

The lower ends of the front and rear masts 42 are connected by a connection portion 46 which is, for example, horizontal, and a portion of the weight of the vehicle 10 is supported by a ground rail 48 via wheels 47. Unshown guide rollers are guided by the ground rails 48 in order to further restrict the vibrations and twists of the masts 42. Since the masts 42 are capable of rocking along the travelling direction, the travelling units 59 are controlled not to accelerate or decelerate at or in a vicinity of the intrinsic frequency of the masts in order to significantly reduce or prevent the vibrations of the masts 42. Further, unshown dampers, damping rubbers, shock absorbers, or the like, are provided in the connection portion between the masts 42 and the chassis 71 so as to reduce the vibration during emergency stops. The connection portion 46 and the ground rails 48 may be omitted, and the number and the structure of the masts 42, or the like, is arbitrary.

Figure 6:
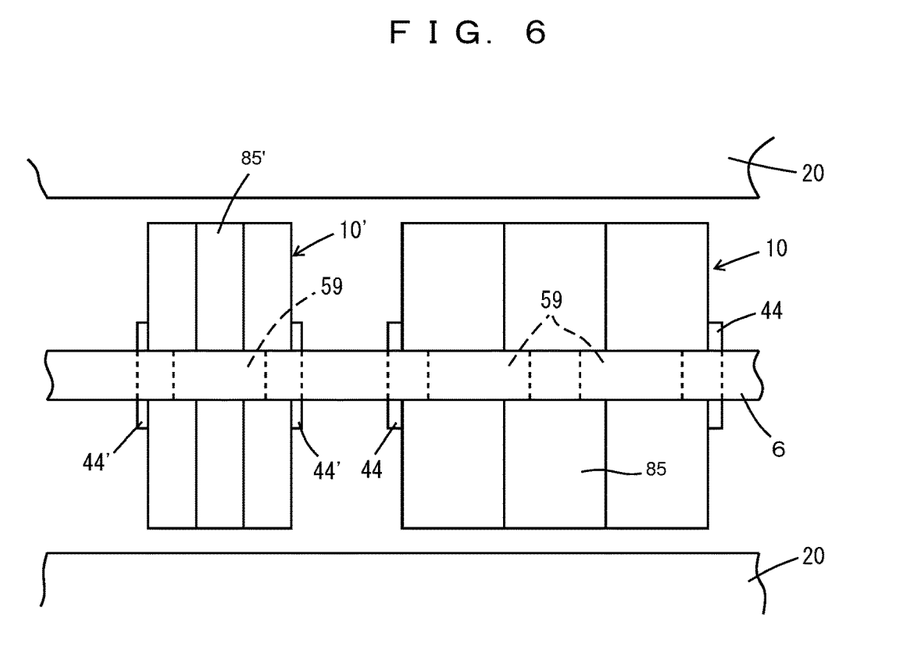
FIG. 6 is a plan view showing two kinds of overhead travelling vehicles travelling on a common rail according to a preferred embodiment of the present invention.

Since the sorting system 2 preferably performs sorting from the pallets 82 to cases, it is preferable to provide other overhead travelling vehicles transporting articles in case units than the overhead travelling vehicles 10 transporting articles on pallets and to make them travel along the same ceiling rails 6. This situation is illustrated in FIG. 6. An overhead travelling vehicle designated by 10' transports articles in case units, has a smaller number of travelling units 59 than the overhead travelling vehicles 10, and includes an elevation platform 44' having a narrower width along the travelling direction than the elevation platform 44. Further, a transfer device 85' has a narrower width to support an article along the travelling direction of the rails 6 than the transfer device 85 has. However, it is preferable to make the length of the transfer devices 85 and 85' equal or substantially equal along a perpendicular direction to the travelling direction of the rails 6 in a horizontal plane so that both the overhead travelling vehicles 10 and 10' are capable to transfer articles between each cell of the racks 20 and between each station 28. The overhead travelling vehicles 10' are configured similarly to the overhead travelling vehicles 10 in other points. Plural transfer devices 85' may be provided on the elevation platform 44' so as to transport plural cases simultaneously.

Figure 7:
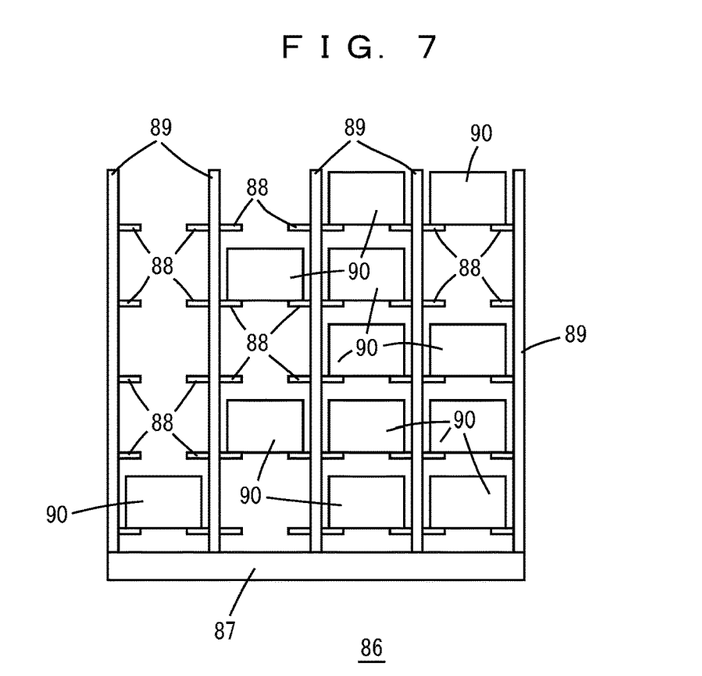
FIG. 7 is a front view of a case pallet used in a preferred embodiment of the present invention.

FIG. 7 shows the case pallet 86. The case pallet 86 is transported by the overhead travelling vehicles 10 in a similar manner with the pallet 82, is placed in each cell of the rack 20, and is transported into the sorting area 50 and the shipment area 24, or the like, via the stations 28. The case pallet 86 includes a base 87 from which pillars 89 stand, a plurality of article supports 88 are fixed to the pillars, and a case 70 such as a cardboard box or a bucket is placed on each of the article supports 88.

The cases are transferred by the sorter 52 shown in FIG. 2, or the like, from the pallets 82 onto the case pallets 86 which are placed in the rack 20 and on the stations 28, and so on. The overhead travelling vehicles 10' sort cases 90 among the case pallets 86, 86 to complete the sorting, and after that the overhead travelling vehicles 10 ship the case pallets 86.

Figure 8:
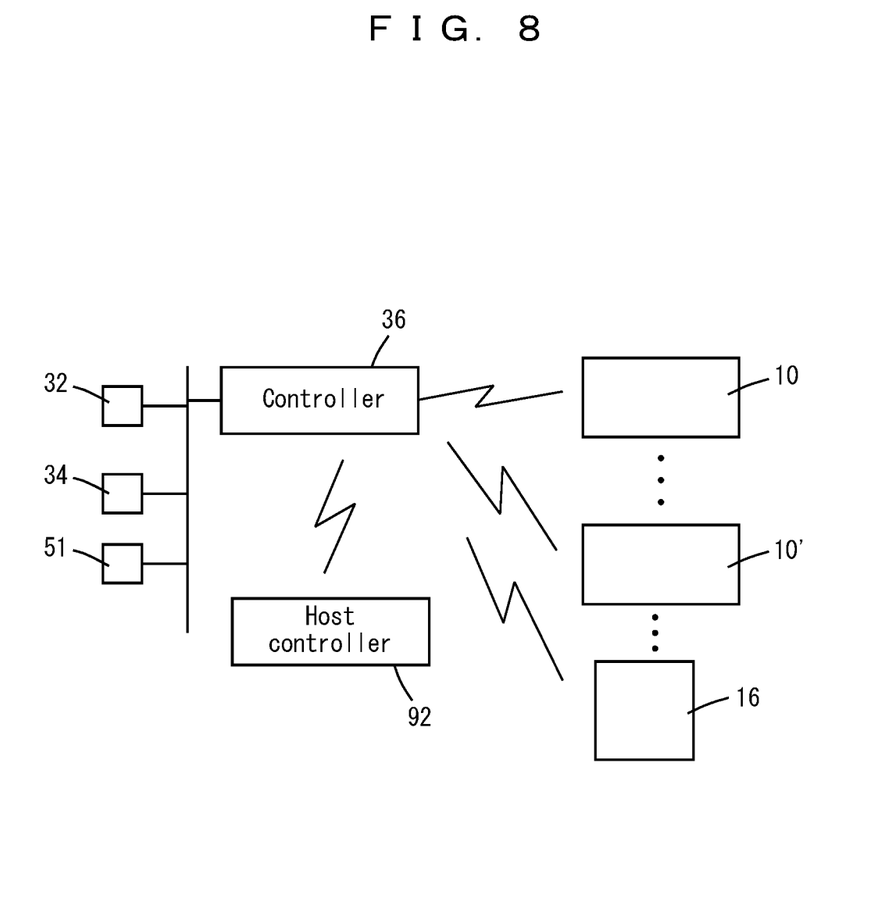
FIG. 8 is a block diagram showing a control system according to a preferred embodiment of the present invention.

FIG. 8 shows the control system of the sorting system 2. The controller 36 communicates with the terminals 32, 34, 51, receives orders regarding the sorting from a host controller 92, controls the overhead travelling vehicles 10, 10', the sorters 52, and so on, to cause the sorting to be carried out, and reports the execution results to the host controller 92.

The present preferred embodiment preferably includes the following features.

The arrival area 22 and the shipment area 24 are preferably provided on the ground floor, the sorting areas 50 are provided on the upper floors, and the overhead travelling vehicles 10 are caused to travel along the travelling route which allows diverging and merging. As a result, a compact sorting system in size is provided.

Since the overhead travelling vehicles 10 and 10' are able to diverge and merge and to move to any of the racks 20 and any of the stations 28, one kind of transporting devices is basically enough.

The overhead travelling vehicles 10 and 10' are enough, if they are able to support the vertical weight added to the masts 42, and are not required to have the rigidity along the travelling direction. Further, the ground carriage may be a simple one or be omitted. Therefore, the overhead travelling vehicles 10 and 10' are lighter in weight than conventional stacker cranes. Since the overhead travelling vehicles 10 and 10' are lighter, the ceiling rails 6 are also made lighter in weight.

Since the linear motor is preferably used, the rails 6 are not subjected forces along the travelling direction. Therefore, the rails 6 are made even lighter in weight.

The retreating lane 12 contributes to power saving and the maintenance deck 14 makes the maintenance of the overhead travelling vehicles 10 and 10' easier.

The sorting system 2 is easily expanded.

The travelling units 59 may be commonly used in both the travelling vehicles 10 and 10'.

The overhead travelling vehicles 10 transport the pallets, and the overhead travelling vehicles 10' may transport cases and sort articles in case units.

While in the present preferred embodiment the overhead travelling vehicles 10' preferably sort articles in case units, other overhead travelling vehicles equipped with an elevation platform including both the transfer device 85 for pallets 82 and the transfer device 85' for cases 90 may be used. The overhead travelling vehicles perform functions of both the travelling vehicles 10 and 10'. Further, the species of the sorting devices provided in the sorting areas 50, the details of the sorting operations, the distribution of the sorting operations between operators and the sorting devices, and so on, are arbitrary.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A sorting system for sorting and shipping commodities, the sorting system comprising:
   a pallet transportation vehicle that travels along a travelling route and is able to diverge and merge along the travelling route;
   a case transportation vehicle that is structurally different from the pallet transportation vehicle, travels along the travelling route, and is able to diverge and merge along the travelling route;
   racks provided along the travelling route and having a height corresponding to multiple floors;
   an arrival area, a shipment area, and a sorting area provided along an outer periphery of the travelling route; and
   a controller configured or programmed to control each of the pallet transportation vehicle and the case transportation vehicle to transport the commodities from the arrival area to the sorting area via the racks and transport the commodities from the sorting area to the shipment area; wherein the travelling route includes rails along which both the pallet transportation vehicle and the case transportation vehicle travel;

the rails are provided in a ceiling space of a building accommodating the sorting system; and each of the pallet transportation vehicle and the case transportation vehicle includes a carriage that travels along the rails, a mast suspended from the carriage, and an elevation platform that includes a transfer device and is able to be raised and lowered along the mast.

2. The sorting system according to claim 1, wherein the arrival area and the shipment area are provided on a ground floor and the sorting area is provided on an upper floor higher than the ground floor.

3. A sorting method for sorting and shipping commodities using a sorting system including a pallet transportation vehicle that travels along a travelling route and is able to diverge and merge along the travelling route, a case transportation vehicle that is structurally different from the pallet transportation vehicle, travels along the travelling route, and is able to diverge and merge along the travelling route, racks provided along the travelling route and having a height corresponding to multiple floors, an arrival area, a shipment area, and a sorting area along an outer periphery of the travelling route, and a controller, the method comprising:

transporting the commodities from the arrival area to the sorting area via the racks and transporting the commodities after sorting from the sorting area to the shipment area by each of the pallet transportation vehicle and the case transportation vehicle under control of the controller; wherein the travelling route includes rails along which both the pallet transportation vehicle and the case transportation vehicle travel;

the rails are provided in a ceiling space of a building accommodating the sorting system; and each of the pallet transportation vehicle and the case transportation vehicle includes a carriage that travels along the rails, a mast suspended from the carriage, and an elevation platform that includes a transfer device and is able to be raised and lowered along the mast.

* * * * *